Aug. 28, 1928.

Re. 17,072

L. OTTINGER

LATCH HANDLE ESCUTCHEON AND BEARING

Original Filed June 28, 1923

INVENTOR
Leon Ottinger
BY
C. P. Gepel
ATTORNEY

Reissued Aug. 28, 1928. Re. 17,072

UNITED STATES PATENT OFFICE.

LEON OTTINGER, OF NEW YORK, N. Y.

LATCH-HANDLE ESCUTCHEON AND BEARING.

Original No 1,540,495, dated June 2, 1925, Serial No. 648,394, filed June 28, 1923. Application for reissue filed May 26, 1927. Serial No. 194 501.

This invention relates to an improved latch escutcheon and handle shaft bearing and has more particular relation to such escutcheons as are used in connection with the latches of automobile doors. Heretofore, it has been the practice to provide a relatively long cast metal bushing threaded or otherwise fixed in the outer end of the handle receiving opening of the door to provide a bearing for the handle, said bushing having a flange or escutcheon plate formed on one end to engage against the face of the door around the latch handle. However, in view of the fact that the inner and outer faces of the door are not parallel, and the wall of the opening does not extend at right angles to the outer face of the door, it is impossible to secure close contact of an escutcheon plate or flange of uniform thickness against the door face entirely around the opening. In other words, at one side of the opening in the door the plate would be slightly spaced from the door face, unless said plate is specially formed and thickened upon one side. Escutcheon members of this type are, therefore, relatively expensive. Also, these escutcheon plates are provided with openings to receive attaching screws threaded in the door which is an additional item of expense.

It is, therefore, the primary object and purpose of my present invention to provide a combined escutcheon and shaft bearing member for door latch handles whereby close contact of the escutcheon against the door face entirely around the opening is assured with a proper accurate alignment of the opening of the escutcheon member with respect to the latch actuating rollback to which the handle is to be connected, regardless of the angular relation of the wall of the handle receiving opening with respect to the face of the door. The bearing means for the latch handle shaft includes a part having an annular bearing surface for engagement about the shaft and accommodation to a non-coinciding axial relation of the shaft and the opening through the door and supporting the shaft for free turning movement in definite angularly projecting relation to the face of the door.

In one embodiment of the invention, I provide an escutcheon member, which, when applied and secured to the door provides a tangential single line bearing contact for the shank of the latch handle. Preferably, the escutcheon member is initially in the form of a sheet metal sleeve having an out-turned rounded bead or other ornamental formation on one end thereof adapted to bear against the outer face of the door around the handle opening therein. In the application of this escutcheon member to the door, I position the same against the door face with the sleeve extending into the handle opening and then properly center said sleeve in concentric relation with the latch actuating rollback. While maintaining pressure against the outer face of the escutcheon member to hold the edge member thereof closely against the door face, I then apply an outward pressure against the inner wall of the inwardly extending part of said member whereby the latter is expanded and the edge thereof is firmly embedded in the wood structure of the door. Thus the escutcheon member is tightly and securely fixed in place at the outer end of the handle opening without the use of screws or other supplemental fastening or attaching means.

It is another object of my invention to provide a combined escutcheon and handle bearing which is of such construction that it may be used in connection with the various types of latches now employed upon automobile doors and will decrease the number of operations required in the application of such latches while providing a neater appearance on the outer face of the door around the latch handle than is possible with the use of such devices now employed in this art.

With the above and other objects in view, the invention consists in the improved escutcheon member and shaft bearing, as will be hereinafter more fully described, illustrated in the accompanying drawing and subsequently incorporated in the subjoined claims.

In the drawing wherein I have disclosed several practical and desirable embodiments of the invention and in which similar reference characters designate corresponding parts throughout the several views.

Figure 1:
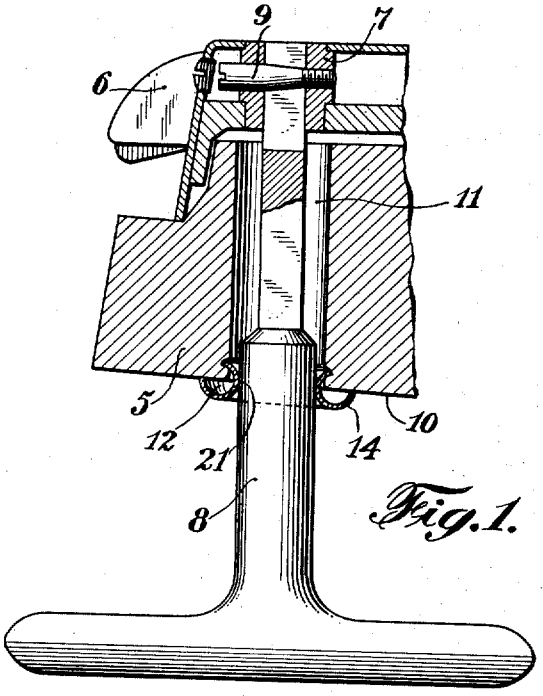
Figure 1 is a horizontal section through an automobile door having a latch applied thereto and equipped with one embodiment of my present improvements.

While the invention to be hereinafter described is more particularly designed for application and use in connection with the doors of automobiles, it will be apparent that the device might also be advantageously used in connection with the latch handles of house doors and in other cases where it is desired to provide a bearing support for the operating handle and a neat and attractive appearance of the outer face of the door surrounding said handle. In the present instance, I have illustrated a part of an automobile door 5 to the inner face of which a latch 6 is applied. As this latch constitutes no essential feature of the present improvements, it may be of any desired construction. For the purpose of this explanation it will suffice to state that the latch mechanism includes an actuating rollback 7 which is suitably mounted in the walls of the latch case for oscillating or rotative movement. The rollback 7 is operated by means of the usual handle 8 and as herein shown, one end of this handle is rigidly fixed in the bore of the rollback by means of the screw 9. Likewise, this handle attaching means constitutes no essential part of the present improvements, the same being fully described and claimed in my co-pending application for patent, Serial No. 613,809, filed January 20, 1923.

It will be observed from reference to Figure 1 of the drawing that the outer face 10 of the door is not disposed in parallel relation to the inner face thereof. Therefore, if the handle receiving opening 11 is bored through the door with its outer end in concentric relation with the axis of oscillation of the rollback 7, it will be apparent that the axle of the opening does not extend at right angles to the door face 10. Accordingly, if a rigid metal bushing having an escutcheon flange or plate on its outer end is threaded into the opening 11, said flange or plate can be brought into close contact with the face 10 of the door only at one side of the opening 11. Various suggestions have been advanced for remedying this difficulty. Thus it has been proposed to use a separate escutcheon plate, loosely mounting the same on the outer end of the bearing bushing, and interposing a spring between said plate and a washer engaging the door around the handle opening. It will be apparent, however, that such a device will be quite expensive and that it is also impossible to attain a tight or close contact of the escutcheon plate with the handle shaft.

Figure 2:
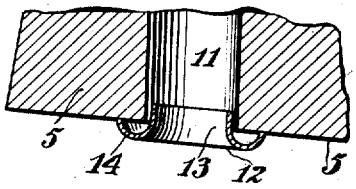
Figure 2 is a similar section showing the initial form of the escutcheon member before securing the same in its final position in the door.

In one embodiment of my present improvements, I provide a combination escutcheon and shaft bearing member 12 in the form of a sheet metal stamping, said member consisting of the sleeve 13 having an outwardly turned semi-cylindrical annular flange or bead 14 formed on one end thereof. As seen in Figure 2 of the drawings, the diameter of the sleeve 13 is appreciably less than the diameter of the opening 11 and in the application of the member 12 to the door, the edge of the flange or bead 14 is closely engaged against the door face 10 entirely around the opening 11 while the sleeve 13 projects into said opening. While I have referred to the escutcheon member as having the semi-cylindrical bead 14 it will, of course, be obvious that since this formation of the sleeve end is purely for purposes of ornamentation, the sheet metal plate from which the device is produced might be of greater area and formed with an escutcheon plate or flange extension of any desired ornamental configuration to extend over a greater area of the door face 10.

Figure 3:
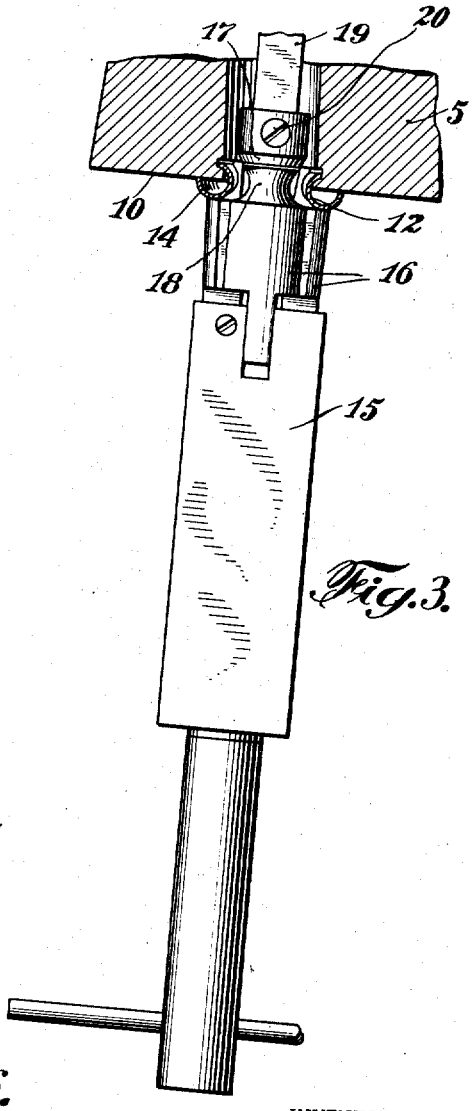
Figure 3 is a sectional view illustrating the centering and expanding tool for the sheet metal escutcheon member.
Figure 4:
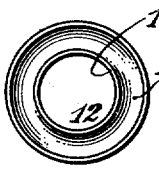
Figure 4 is an inner face view of the escutcheon member in its original form.

After the escutcheon and bearing member has been positioned, as seen in Figure 2 of the drawings, the expanding tool 15 illustrated in Figure 3, is then applied. This expanding tool may be of any conventional construction, but as illustrated is provided with a plurality of pivotally mounted expanding members 16 between which a conoidal expanding head 17 is arranged. Each of the members 16 has a reduced deeply grooved or concaved end portion 18. The expanding head 17 is preferably provided with a socket to receive the end of the centering rod 10 which is detachably fixed in said socket by the screw 20.

In arranging the expanding tool in position, the members 16 are positioned against the escutcheon flange or bead 14 with their reduced end portions 18 extending through the sleeve 13. In order to insure a concentric relationship of the sleeve 13 with the axis of the latch actuating rollback 7, the end of the centering rod 19 is engaged in the bore of said rollback. The expanding tool 15 is then operated to force the members 16 radially outward so that their concave end portions 18 will exert an expanding pressure against the sleeve 13 extending into the opening 11. Thus this end of the sleeve will be outwardly expanded and the edge thereof firmly embedded in the wood structure of the door 5 around the opening or passage 11 extending therethrough. In this expanding action, it will be understood that the members 16 of the tool bearing against the escutcheon flange or bead 14 holds the edge thereof in close bearing contact against the door face 10. Thus at all points around the outer end of the opening 11 the escutcheon flange will be in positive contact with the face of the door. After the expanding tool is removed the member 12 is then in the form of a tubular annulus open at one side thereof with one edge of said open side extending into the opening 11 of the door and embedded in the door structure. Thus, as seen in Fig. 1 of the drawing, when the operating handle 8 for the latch rollback 7 is inserted and secured to said rollback, the handle shank will have a single circumferential point of bearing contact upon the inner face of the tubular escutcheon at 21. In Figure 1 of the drawing, I have illustrated the opening 11 in the door having its outer end concentric with the rollback 7, while in Figures 2 and 3 of the drawing, the opening 11 is supposed to have been inaccurately bored through the door so that its outer end is eccentric to the rollback. In the latter instance, it will be understood that the proper centering of the sleeve 13, before expansion in the end of the opening 11, is essential in order that the shank of the handle may be properly fitted or mounted in the escutcheon and bearing member after its application to the door. Therefore, it will be noted that since the outer face 10 of the door is positioned at an obliquely inclined plane and the escutcheon and bearing member is fixed in parallel relation to the door face, the annular bearing surface 21 of said member having contact upon the periphery of the handle shaft 8 is positioned in a plane at right angles to the shaft axis, but out of parallel relation to the door face 10. On the other hand, when the opening 11 is drilled through the door on a line at right angles to the inclined outer face 10 thereof with the inner end of said opening concentric with the rollback, the outer end of the opening is necessarily in eccentric relation to the rollback. However, in such case the plane of bearing contact of the surface 21 of the member 12 upon the handle shaft will then be in parallel relation to the door face 10 but in eccentric relation to the rollback. It is of course, also possible that in some instances the plane of contact of the surface 21 upon the handle shaft may be in non-parallel relation to the door face 10, as well as in eccentric relation to the rollback, depending upon the plane of the outer face of the door and the location of the opening 11 with respect to the rollback. Therefore, it will be seen that a shaft bearing means of the character above described will accommodate itself to various axial relations of the shaft and the door opening while providing an adequate bearing support sustaining the shaft at the outer face of the door for free rotation and in definite angularly projecting relation to the door face.

Figure 5:
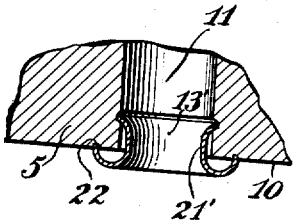
Figures 5 and 6 are detail sections illustrating several alternative forms of the device.

In Figure 5 of the drawing, I have shown a slightly modified form of the device in which the sleeve 13′ is of greater length to provide a relatively long straight intermediate bearing portion 21′ for the handle shaft instead of the single point circumferential contact above referred to. Also, in this case, I may embed the outer edge of the escutcheon bead or flange in the face of the door as shown at 22, as well as expanding the inner end edge of the sleeve 13′ into the door structure.

Figure 6:
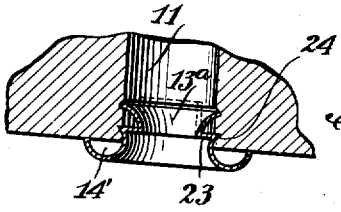

In automobile door latches having the solid metal sleeve or bushing threaded into the outer end of the handle opening, such bushing is usually provided with an internal annular shoulder intermediate of its ends against which a shoulder formed on the handle shank seats. In order to adapt my invention for use in connection with latches having such a shouldered handle shank, I may provide the construction shown in Figure 6 of the drawings wherein the sleeve is provided at the inner side of the semi-tubular escutcheon flange or bead 14′ with an inwardly projecting annular shoulder 23. The reduced end portion of the sleeve indicated at 13ª is expanded to embed its edge in the door structure, and the expanding tool may be of such form as to also contract the semi-tubular bead or escutcheon flange 14′ slightly and thus embed the sharp circumferential edge 24 formed at the juncture of said escutcheon flange with the wall of the shoulder 23 into the wood. These two spaced points of engagement of the metal member in the door structure provide greater security.

From the foregoing description considered in connection with the accompanying drawing it is believed that the construction of my improved escutcheon and handle bearing for door latch handles will be clearly and fully understood. Owing to the fact that after positioning the escutcheon member, it may be firmly and securely fixed upon the door by a single operation of the expanding tool, it will be apparent that the time required in the application of such shaft bearing and escutcheon members is very materially reduced over that necessary in the application of such devices as are now very generally employed in this art. It will further be appreciated that since I eliminate the necessity of using screws or other fastening members, the cost of this item of automobile body construction is very greatly reduced. Also as I altogether discard the threaded bearing bushing heretofore employed, extreme accuracy in the boring of the handle receiving opening in the door structure becomes unnecessary so that there will be a further reduction of time consumed in the application of the latch to the door. These several items when compared with the total manufacturing cost of the individual automobile body may seem quite insignificant, yet in the aggregate they constitute an appreciable item of expense. By eliminating such expensive details, my present invention enables the manufacturer to speed up production, and thus correspondingly decrease his overhead expense.

I have referred in the foregoing description and illustrated in the drawings several forms or embodiments of my present invention which are entirely practical for the purpose in view. Nevertheless, it will be manifest that the same desirable results might possibly be secured by utilizing a combination bearing and escutcheon member of other structural forms than those herein disclosed. Accordingly it is to be understood that I reserve the privilege of resorting to all such legitimate changes in the several novel features of my present improvements as may be fairly embodied within the spirit and scope of the invention as claimed.

I claim:

1. In combination with a door structure having a latch handle receiving opening, a latch operating rollback at one end of said opening and an operating handle adapted to be connected to said rollback; a bearing member for the handle shaft permanently fixed in the door structure at the other end of said opening and having a continuously curved or convex surface presenting a single circumferential line of bearing contact for the handle shaft in tangential relation thereto.

2. In combination with a door structure having a latch handle receiving opening, a latch operating rollback at one end of said opening and an operating handle adapted to be connected to said rollback; a bearing member for the handle shaft permanently fixed in the door structure at the other end of said opening and having a continuously curved or convex surface presenting a single circumferential line of bearing contact for the handle shaft in tangential relation thereto, said member having an integrally formed escutcheon flange closely contacting with the face of the door at all points around said opening.

3. In combination with a door structure having a latch handle receiving opening, a latch operating rollback at one end of said opening and an operating handle adapted to be connected to said rollback; a combined bearing and escutcheon member for said handle consisting of a one-piece metal annulus having an edge thereof in close contact with the face of the door surrounding the other end of said opening and its other edge extending into the opening and embedded in the door structure.

4. In combination with a door structure having a latch handle receiving opening, a latch operating rollback at one end of said opening and an operating handle adapted to be connected to said rollback; a combined bearing and escutcheon member for said handle consisting of a one-piece metal annulus positioned at the opposite end of said opening in concentric relation to the latch rollback and having one of its edges in close contact with the face of the door surrounding the end of said opening and its other edge extending into the opening and embedded in the door structure, said annulus being formed with an inner convex surface presenting a single circumferential line of bearing contact with the handle shaft in tangential relation thereto.

5. In combination with a door structure having a latch handle receiving opening, a latch operating rollback at one end of said opening and an operating handle adapted to be connected to said rollback; a combined bearing and escutcheon member for said handle consisting of a tubular sheet metal annulus having a circumferential opening, the edge portion of said annulus at one side of the opening therein extending into the other end of the opening in the door structure and being embedded in the wall of said opening, the other edge of the annulus at the opposite side of the circumferential opening therein closely contacting with the side face of the door at all points surrounding said opening.

6. In combination with a door structure having a latch handle receiving opening, a latch operating rollback at one end of said opening and an operating handle adapted to be connected to said rollback; a combined bearing and escutcheon member for said handle permanently fixed to the door structure at the other end of the opening therein and consisting of a one-piece sheet metal element having an escutcheon flange formed on one end closely contacting with the face of the door around the end of said opening and an annular portion extending into the opening from said escutcheon flange and having an outwardly turned edge firmly embedded in the wall of said opening and constituting the sole securing means for said member.

7. A combined bearing and escutcheon member for door latch handles having a part adapted to be engaged closely upon the door face at all points around the handle opening in the door, and another part to extend within said opening providing a circumferential edge portion adapted to be subjected to an expanding pressure and embedded in the structure of the door.

8. A combined bearing and escutcheon member for door latch handles consisting of a sheet metal sleeve adapted to be positioned in one end of the handle opening in the door, said sleeve having an escutcheon flange formed on one end thereof adapted to closely contact with the door face at all points around the opening therein, the other end of said sleeve extending into the opening adapted to be outwardly expanded and embedded into the wood of the door to secure said member in place.

9. In combination with a structure having an opening therethrough and a shaft of appreciably less diameter than said opening, a bearing member fixed to said structure at one end of said opening and having an annular convex bearing surface for the shaft concentrically related to the end of said opening and presenting a single circumferential line of bearing contact upon the periphery of the shaft whereby said shaft may be rotatably supported by said bearing member with the axis of said shaft out of coinciding relation with the axis of said opening.

10. In combination with a structure having an opening therethrough and a shaft extending through said opening, a bearing member for said shaft consisting of a sheet metal annulus having a part embedded in said structure at one end of the opening therein and having a convex portion presenting a single line of circumferential bearing contact upon the periphery of said shaft whereby said shaft may be rotatably supported by said bearing member with a minimum of friction with the shaft axis out of coinciding relation with the axis of said opening.

11. In combination with a door structure having a latch shaft opening, a latch including a rotary actuating member mounted upon the door, and a latch shaft connected to said actuating member extending through said opening in relation to the wall thereof as determined by the relative location of said opening and the actuating member, and shaft bearing means including a part secured to the door structure and a bearing part having a shaft supporting surface contacting with the shaft upon insertion of the latter through said opening to provide a continuous annular bearing surface engaged with the shaft and wholly positioned in a plane at right angles to the shaft axis regardless of the angular relation which said axis may assume with respect to the opening through the door.

12. In combination with a door structure having an opening therethrough and a latch provided with a rotatable actuating member, an operating shaft for the latch extending through said opening and rigidly connected at one end to said actuating member, and a support for said shaft fixed to the door at one side thereof having bearing means for a shaft section of uniform diameter and permitting of the insertion of the shaft through said opening with the plane of contacting engagement between said shaft section and the bearing means determined by the fixed angular relation between the shaft axis and said opening with respect to the plane of the door surface.

13. In combination with a door structure having an opening therethrough and a latch provided with a rotatable actuating member, an operating shaft for the latch and means for rigidly connecting one end of said shaft to said actuating member constituting the sole means for retaining said shaft in assembled relation with the door, and a supporting member for said shaft mounted on the door in spaced relation to the actuating member and having a bearing surface for supporting contact with a part of the shaft intermediate of its ends having a uniform diameter and permitting of the insertion of the shaft and its connection to said actuating member with the axis of said shaft disposed at other than an angle of 90° with respect to the general plane of said bearing member while maintaining continuous contact between said bearing surface and the periphery of the shaft to support the latter for free rotation in definite projecting relation with the face of the door structure.

14. A combined bearing and escutcheon member for door latch handles having a part adapted to be engaged upon the door face around the handle opening in the door and provided with an annular bearing surface for the latch handle shaft permitting of the insertion of the shaft through the door opening with the plane of bearing contact between said surface and the periphery of the shaft disposed out of parallel relation to the general plane of said member and supporting the shaft for free rotation relative to said member.

15. In combination with a door structure having a latch handle receiving opening and a standard latch operating shaft adapted for insertion through said opening and connection with the latch on one side of the door, and bearing means for the latch shaft at the opposite side of the door adapted to receive a section of the shaft of uniform diameter, and said bearing means consisting of a part having a convex surface presenting a single circumferential line of bearing contact with the handle shaft in tangential relation thereto.

16. In combination with a door structure having a latch handle receiving opening, bearing means at one end of said opening consisting of a sheet metal part adapted to receive a section of the handle shaft of uniform diameter and formed to provide a convex surface presenting a single circumferential line of bearing contact with the handle shaft in tangential relation thereto.

In testimony that I claim the foregoing as my invention, I have signed my name hereto.

LEON OTTINGER.